US011296428B2

(12) United States Patent
Moon et al.

(10) Patent No.: US 11,296,428 B2
(45) Date of Patent: Apr. 5, 2022

(54) SYSTEMS AND METHODS FOR ANTENNA PLACEMENT FOR WIRELESS COMMUNICATIONS

(71) Applicant: Samsung Electronics Co., Ltd., Suwon-si (KR)

(72) Inventors: Jang Wook Moon, San Diego, CA (US); Hongbing Cheng, San Diego, CA (US); Kee-Bong Song, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 77 days.

(21) Appl. No.: 16/929,035

(22) Filed: Jul. 14, 2020

(65) Prior Publication Data
US 2021/0273345 A1      Sep. 2, 2021

Related U.S. Application Data

(60) Provisional application No. 62/984,201, filed on Mar. 2, 2020.

(51) Int. Cl.
*H01Q 21/20*      (2006.01)
*H01Q 9/04*       (2006.01)

(52) U.S. Cl.
CPC ......... *H01Q 21/20* (2013.01); *H01Q 9/0407* (2013.01)

(58) Field of Classification Search
CPC .... H01Q 1/22–38; H01Q 7/00; H01Q 9/0407; H01Q 21/06–24
See application file for complete search history.

(56) References Cited

U.S. PATENT DOCUMENTS

| 5,973,638 | A | 10/1999 | Robbins et al. |
| 6,897,830 | B2 * | 5/2005 | Bae ........................ H01Q 1/243 343/895 |
| 7,948,444 | B2 | 5/2011 | Signell et al. |

(Continued)

OTHER PUBLICATIONS

M. H. C. Garcia, M. Iwanow and R. A. Stirling-Gallacher, "LOS MIMO Design Based on Multiple Optimum Antenna Separations," in *2018 IEEE 88th Vehicular Technology Conference (VTC-Fall)*, Chicago, IL, USA, 2018, 5 pages.

(Continued)

*Primary Examiner* — Hasan Islam
(74) *Attorney, Agent, or Firm* — Lewis Roca Rothgerber Christie LLP

(57) ABSTRACT

A first antenna array includes antenna panels including: first antenna panels arranged on a first circle having a first radius, each of the first antenna panels including antenna elements; and second antenna panels arranged on a second circle having a second radius, each of the second antenna panels including antenna elements, the second circle being concentric with the first circle at a center point, the second antenna panels being arranged at a first angle around the center point with respect to the first antenna panels, the first radius, the second radius, and the first angle being computed in accordance with wireless transmission conditions including: a line-of-sight distance to a second antenna array including third antenna panels arranged on two or more circles; and a carrier frequency of a line-of-sight wireless transmission between the first antenna array and the second antenna array.

22 Claims, 7 Drawing Sheets

(56) References Cited

U.S. PATENT DOCUMENTS

| | | |
|---|---|---|
| 8,340,588 B2 | 12/2012 | Nielsen et al. |
| 8,811,511 B2 | 8/2014 | Sayeed et al. |
| 10,070,325 B2 | 9/2018 | Logothetis |
| 10,567,043 B2 | 2/2020 | Tang et al. |
| 10,868,370 B2 * | 12/2020 | Saitou ............... H01Q 7/00 |
| 2009/0146902 A1 * | 6/2009 | Li ............... H01Q 21/061 343/867 |
| 2011/0211622 A1 | 9/2011 | Wang et al. |
| 2015/0270885 A1 | 9/2015 | Chang et al. |

OTHER PUBLICATIONS

F. Bohagen, P. Orten and G. E. Oien, "Design of Optimal High-Rank Line-of-Sight MIMO Channels," *IEEE Transactions on Wireless Communications*, vol. 6, No. 4, pp. 1420-1425, 2007.

L. Zhou and Y. Ohashi, "Low complexity millimeter-wave LOS-MIMO precoding systems for uniform circular arrays," in *2014 IEEE Wireless Communications and Networking Conference (WCNC)*, Istanbul, Turkey, 2014, 5 pages.

* cited by examiner

SYSTEMS AND METHODS FOR ANTENNA PLACEMENT FOR WIRELESS COMMUNICATIONS

CROSS-REFERENCE TO RELATED APPLICATION(S)

The present application claims priority to and the benefit of U.S. Provisional Application No. 62/984,201, filed Mar. 2, 2020, entitled "SYSTEM AND METHOD FOR ANTENNA LOCATION DESIGN FOR WIRELESS COMMUNICATIONS," the entire content of which is incorporated herein by reference.

FIELD

One or more aspects of embodiments of the present disclosure relate to systems and methods for antenna placement for wireless communications.

BACKGROUND

In the field of wireless communications, line-of-sight (LOS) communication refers to direct paths between transmitting or source antennas and receiving antennas, without obstructions such as walls or the Earth. Line-of-sight communication is particularly important when operating at high frequencies, such as in the Frequency Range 2 (FR2) frequency band of 24.25 GHz to 52.6 GHz of the 5G New Radio (NR) standard and at higher frequencies, such as in the terahertz (THz) frequency band that may be used in upcoming 6G wireless communications.

In the area of line-of-sight communications, one major performance bottleneck is correlations between antennas, due to the lack of multi-paths (e.g., multiple paths between the transmitting antennas and the receiving antennas due to interactions such as reflection, refraction, and diffraction with the environment). Without careful design of antenna panels, the channel conditions can become unfavorable, thereby causing overall performance degradation.

SUMMARY

Aspects of embodiments of the present disclosure relate to systems and methods for antenna placement to increase or maximize communication throughput between antenna panels by reducing or minimizing inter-antenna correlations.

According to one embodiment of the present disclosure, a first antenna array includes antenna panels, the antenna panels including: one or more first antenna panels arranged on a first circle having a first radius, each of the first antenna panels including one or more antenna elements; and one or more second antenna panels arranged on a second circle having a second radius, each of the second antenna panels including one or more antenna elements, the second circle being concentric with the first circle at a center point, the one or more second antenna panels being arranged at a first angle around the center point with respect to the one or more first antenna panels, the first radius, the second radius, and the first angle being computed in accordance with wireless transmission conditions including: a line-of-sight distance to a second antenna array including one or more third antenna panels arranged on two or more circles; and a carrier frequency of a line-of-sight wireless transmission between the first antenna array and the second antenna array.

The wireless transmission conditions may further include: a number of the antenna panels in the first antenna array; a number of circles on which the antenna panels of the first antenna array are arranged; and a number of antenna elements in each of the antenna panels.

The wireless transmission conditions may further include: a number of the third antenna panels in the second antenna array; and a number of circles on which the third antenna panels of the second antenna array are arranged.

The first antenna array may further include an antenna array controller configured to: compute a second angle between the first antenna array and the second antenna array, the first radius, the second radius, and the first angle in accordance with changes in the wireless transmission conditions: and reconfigure the first antenna array based on the first radius, the second radius, the first angle, and the second angle.

The antenna array controller may be configured to activate the first antenna panels and the second antenna panels selected from a grid of antenna panels in accordance with the first radius, the second radius, the first angle, and the second angle.

The antenna array controller may be configured to control one or more actuators to position the first antenna panels and the second antenna panels in accordance with the first radius, the second radius, the first angle, and the second angle.

The first antenna panels and the second antenna panels may be spaced non-uniformly around the first circle and the second circle.

The first radius may be the same as the second radius.

The first radius may be different from the second radius.

The first radius, the second radius, and the first angle may be computed in accordance with optimizing a performance metric.

The performance metric may be computed based on one or more of: minimizing a decoding error probability; maximizing a channel capacity; and minimizing channel correlations.

According to one embodiment of the present disclosure, a method for configuring a first antenna array and a second antenna array includes: receiving wireless transmission conditions including: a line-of-sight distance D between: a first antenna array including first antenna panels arranged on two or more first circles; and a second antenna array including second antenna panels arranged on two or more second circles; and a carrier frequency $\lambda$ of a line-of-sight wireless transmission between the first antenna array and the second antenna array; computing antenna array parameters for the first antenna array and the second antenna array based on the wireless transmission conditions, the antenna array parameters including: one or more first radii r of the first circles of the first antenna array; one or more first rotational offsets $\beta_i$ between the first circles of the first antenna array; one or more second radii $\rho$ of the second circles of the second antenna array; one or more second rotational offsets $\beta_j$ between the second circles of the second antenna array; and a rotational offset $\alpha$ between the first antenna array and the second antenna array.

The wireless transmission conditions may further include: a number of first antenna panels M in the first antenna array; a number of circles Cr in the first antenna array; a number of second antenna panels N in the second antenna array; a number of circles Ct in the second antenna array; and a number of antenna elements Q in each of the first antenna panels and each of the second antenna panels.

The computing the antenna array parameters may include determining that: the number of first antenna panels M in the first antenna array and the number of second antenna panels N in the second antenna array are both equal to four; and the first antenna panels are arranged in two first circles in the first antenna array and the second antenna panels are arranged in two second circles in the second antenna array.

The computing the antenna array parameters may include: determining that the wireless transmission conditions indicate that the first radii r of the first circles of the first antenna array are different from the second radii ρ of the second circles of the second antenna array; and computing the antenna array parameters in accordance with constraints:

$$r_0\rho_0 = \frac{k\lambda D}{4}, k = 1, 3, 5, \ldots$$

$$r_0\rho_0 + r_1\rho_1 = \frac{m\lambda D}{2}, m = 1, 3, 5, \ldots$$

$$r_1\rho_1 = \frac{l\lambda D}{4}, l = 1, 3, 5, \ldots$$

where $r_0$ and $r_1$ are the radii of the two first circles of the first antenna array and $\rho_0$ and $\rho_1$ are the radii of the two second circles of the second antenna array.

The computing the antenna array parameters may include: determining that the wireless transmission conditions indicate that: the first radii r of the first circles of the first antenna array are the same as the second radii ρ of the second circles of the second antenna array; and that the rotational offsets $\beta_i$ between the two first circles of the first antenna array and between the two second circles of the second antenna array are both 90°; and computing the antenna array parameters in accordance with constraints:

$$2cr_1^2(c \cdot \cos \alpha + a \sin \alpha) = \frac{k\lambda D}{2}, \text{ where } a = \pm 1, k = \pm 1, \pm 3, \pm 5, \ldots$$

$$(r_0^2 + r_1^2) \cos \alpha = \frac{l\lambda D}{2}, \text{ where } l = \pm 1, \pm 3, \pm 5, \ldots$$

$$2r_1^2(c \cdot \sin \alpha + b \cos \alpha) = \frac{m\lambda D}{2}, \text{ where } b = \pm 1, m = \pm 1, \pm 3, \pm 5, \ldots$$

where $r_0$ and $r_1$ are the radii of the two first circles of the first antenna array and c is a ratio between the radii $r_0$ and $r_1$ of the two first circles of the first antenna array.

The computing the antenna array parameters may include: determining that the wireless transmission conditions indicate that: the first radii r of the first circles of the first antenna array are the same as the second radii ρ of the second circles of the second antenna array; the rotational offsets $\beta_i$ between the two first circles of the first antenna array and between the two second circles of the second antenna array are not both 90°; and the rotational offset α between the first antenna array and the second antenna array is 0°; and computing the antenna array parameters in accordance with constraints:

$$r_1^2 = \frac{k\lambda D}{4c(c + a \cos \beta)}, a = \pm 1, k = \pm 1, \pm 3, \pm 5, \ldots$$

$$r_1^2 = \frac{l\lambda D}{2(c^2 - 1)}, l = \pm 1, \pm 3, \pm 5, \ldots$$

$$r_1^2 = \frac{m\lambda D}{4(c \cos \beta + b)}, b = \pm 1, m = \pm 1, \pm 3, \pm 5, \ldots$$

$$\cos \beta = \frac{(k - 2l)c^2 - k}{2lca}$$

where $r_0$ and $r_1$ are the radii of the two first circles of the first antenna array and c is a ratio between the radii $r_0$ and $r_1$ of the two first circles of the first antenna array.

The computing the antenna array parameters may include determining that: the number of first antenna panels M in the first antenna array and the number of second antenna panels N in the second antenna array are not both equal to four; or the first antenna panels are not arranged in two first circles in the first antenna array or the second antenna panels are not arranged in two second circles in the second antenna array; and computing the antenna array parameters in accordance with constraint:

$$r_i^2 = \frac{\lambda D}{k_i c_i^2} \text{ and } \rho_j^2 = \frac{\lambda D}{l_j \sigma_j^2}$$

where $r_i$ is the radius of the ith circle of the first antenna array, $c_i$ is a ratio between the radius $r_i$ of the ith circle of the first antenna array and the radius $r_{C_r-1}$ of the outermost circle $C_r-1$ of the first antenna array, where $c_{C_r-1}=1$, and $k_i$ is a positive scaling parameter, and where $\rho_j$ is the radius of the jth circle of the second antenna array, j=0, . . . , $C_t-1$, $\sigma_j$ is the ratio of the diameter of the jth circle to the outermost outer circle $C_t-1$, where $\sigma_{C_t-1}=1$, and $l_j$ is a positive scaling parameter.

The method may further include: computing the antenna array parameters in accordance with changes in the wireless transmission conditions; and reconfiguring the first antenna array and the second antenna array in accordance with the antenna array parameters.

The reconfiguring the first antenna array and the second antenna array may include: activating the first antenna panels from a first grid of antenna panels of the first antenna array and the second antenna panels from a second grid of antenna panels of the second antenna array in accordance with the antenna array parameters.

The first grid of antenna panels may be arranged on: a flat plane; a portion of a cylinder; or a portion of a sphere.

The reconfiguring the first antenna array and the second antenna array may include: moving the first antenna panels and the second antenna panels using one or more actuators to arrange the first antenna panels and the second antenna panels in accordance with the antenna array parameters.

These and other features, aspects and advantages of the embodiments of the present disclosure will be more fully understood when considered with respect to the following detailed description, appended claims, and accompanying drawings. The actual scope of the invention is defined by the appended claims.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

DETAILED DESCRIPTION

Figure 1:
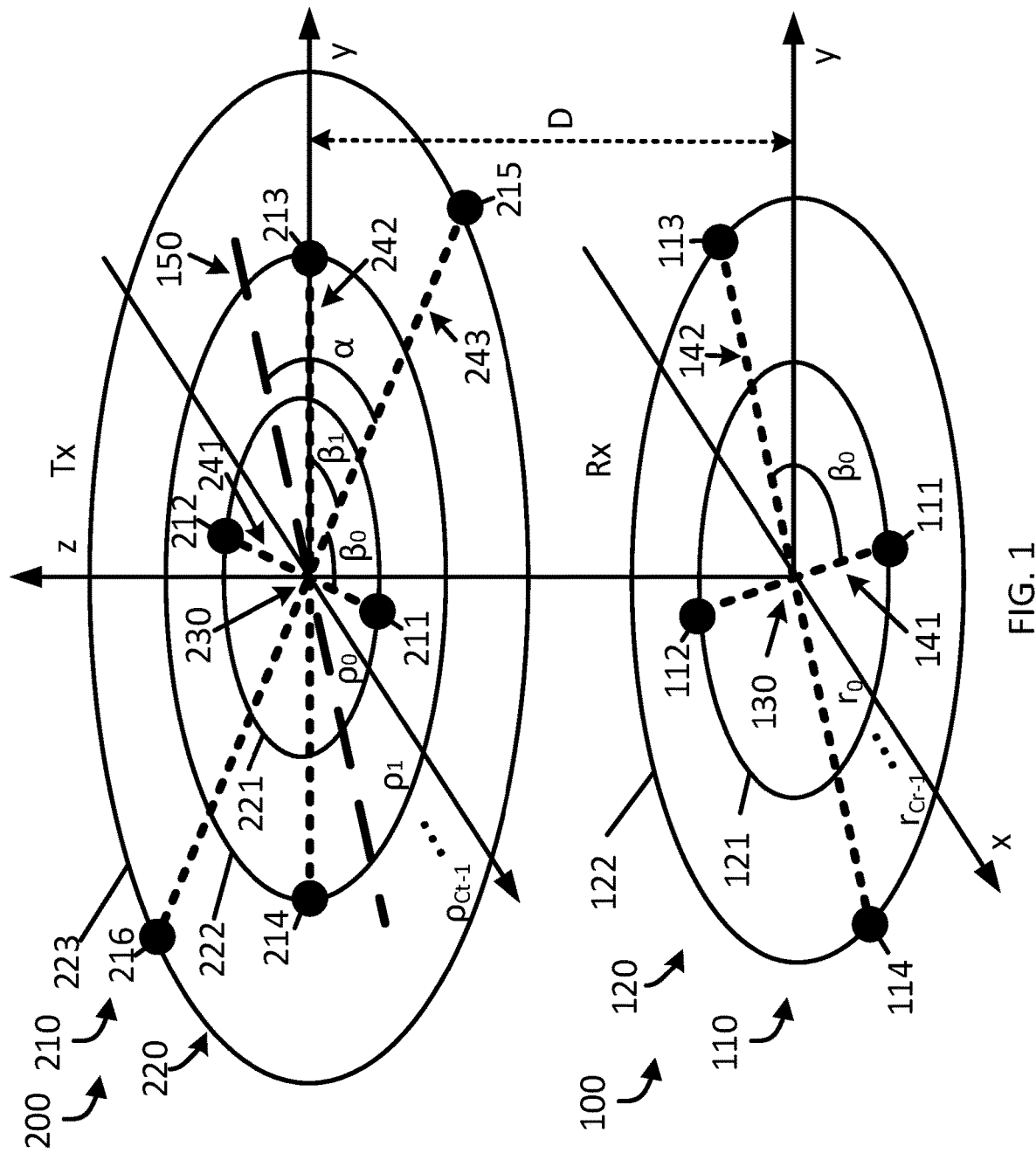
FIG. 1 is a schematic depiction of a model for antenna locations in accordance with one embodiment of the present disclosure.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, in the drawings, the relative sizes of elements, and regions may be exaggerated and/or simplified for clarity.

In line-of-sight (LOS) wireless communications, undesired correlations between wireless channels can cause degradation in communication performance (e.g., as measured by signal-to-noise ratios and/or error rates). In comparative systems, the antenna configuration is fixed for all communication scenarios, and the antennas are typically spaced at half of the operating wavelength. However, this configuration may be sub-optimal for LOS communications.

One way to implement wireless communication devices (e.g., cellular radios) that can avoid channel correlations and successfully operate in those scenarios is to configure or arrange the active antenna elements (or antenna panels) of the antenna arrays to provide favorable channel conditions for particular communications scenarios. However, comparative approaches for generating antenna panel arrangements are generally constrained to producing very regular (uniform) antenna locations and fail to identify solutions that involve the irregular arrangement of antenna elements or antenna panels in the antenna array. Therefore, there are circumstances in which comparative approaches may fail to generate workable solutions, such as in circumstances where there are particular physical space or shape constraints on the arrangement of antenna panels or antenna elements, where a regular (or uniform) antenna arrangement would not meet the physical constraints, but an irregular (or non-uniform) antenna arrangement may meet the physical constraints.

Accordingly, aspects of embodiments of the present disclosure relate to methods for placing antenna elements or antenna panels to avoid or reduce channel correlations and thereby improve the performance of LOS channels. Aspects of embodiments of the present disclosure also relate to antenna systems having antenna elements or antenna panels placed accordingly. Aspects of embodiments of the present disclosure may be applied to a variety of LOS wireless communication environments, including fixed transmit and receive locations such as indoor data centers and wireless backhaul connections for outdoor cellular base stations. Some aspects of embodiments of the present disclosure relate to determining locations of the antennas elements or antenna panels in accordance with a variety of parameters including the distance between the transmitter and receiver (Tx-Rx distance).

Some aspects of embodiments of the present disclosure relate to computing an arrangement of antennas by improving or optimizing a performance metric such as minimizing a decoding error probability, maximizing a channel capacity or throughput, and/or minimizing the antenna correlations. Some aspects of embodiments of the present disclosure relate to the antenna panels in which the antenna elements (e.g., antenna panels) are arranged on concentric circles. Embodiments of the present disclosure are also capable of computing arrangements of very large numbers of antennas on an antenna panel. Some aspects of embodiments of the present disclosure also relate to automatically computing an antenna arrangement based on current environmental conditions and communications scenarios, and automatically selecting a subset of antenna panels from a group of antenna panels in accordance with the computed antenna arrangement.

FIG. 1 is a schematic depiction of a model for antenna locations in accordance with one embodiment of the present disclosure. In the embodiment shown in FIG. 1, a receiving antenna array 100 includes a plurality of receiving antenna panels 110 (N antenna panels) where the embodiment of FIG. 1 shows four (N=4) receiving antenna panels 111, 112, 113, and 114. Each of the receive antenna panels 110 may include one or more antenna elements (where the number of antenna elements in a panel 110 is denoted by Q), such as where each receive antenna panel includes a single antenna element (Q=1) or an array of antenna elements (Q>1). The antenna elements are arranged on a plurality of receive circles 120 (individually identified as receive circles 121 and 122). The receiving antenna array 100 includes Cr circles (Cr is the number of receive circles), and each of the receive circles 120 has a corresponding radius identified as $r_0$, $r_1$, ..., $r_{Cr-1}$. In some embodiments, each receive circle has a different radius. In some embodiments, some of the receive circles may have the same radius as one another.

In the embodiment shown in FIG. 1, the receive circles 120 are depicted as being coplanar in an xy-plane and concentric around a receive center point 130. Each receive circle 120 may have a corresponding rotational offset β as measured from the outermost receive circle (e.g., having the largest radius). For example, the first receive circle 121 is rotationally offset from the outermost receive circle 122 by angle $β_1$. (According to this notation, there may be Cr rotational offsets: $β_0, β_1, ..., β_{Cr-1}$. Assuming that the (Cr−1)-th receive circle has the largest radius, then $β_{Cr-1}=0°$.) The rotational offset may be measured between the line segments (or rays) between the receive center point 130 and one of the receiving antenna panels 110 of each receive circle (e.g., a lowest numbered antenna element of its circle). In the embodiment shown in FIG. 1, first receiving antenna panel 111 and second receiving antenna panel 112 are on the first receive circle 121 (having radius $r_0$), and third receiving antenna panel 113 and fourth receiving antenna panel 114 are on second receive circle 122 (having radius $r_t$). Accordingly, the angle $\beta_0$ is defined as the angle between a first ray 141 between the receive center point 130 and the first receiving antenna panel 111 on the first receive circle 121 and a second ray 142 between the receive center point 130 and the third receiving antenna panel 113 on the second (outermost) receive circle 122 (having radius $r_{Cr-1}$).

The embodiment shown in FIG. 1 also includes a transmitting antenna array 200 spaced apart from the receiving antenna array 100 by a distance D along the z-axis (e.g., perpendicular to the xy-plane). The receiving antenna array 100 and the transmitting antenna array 200 may be referred to as a first antenna array and a second antenna array. In addition, the terms "transmitting" and "receiving" are used herein to identify the different antenna arrays out of convenience. Embodiments of the present disclosure include embodiments where an arrangement of antenna panels of a "receiving" antenna array and a "transmitting" antenna array be used for LOS wireless transmissions from the "receiving" antenna array to the "transmitting" antenna array and vice versa.

The transmitting antenna array 200 includes a plurality of transmitting antenna panels 210 (M transmitting antenna elements) where the embodiment shown in FIG. 1 includes six (M=6) transmitting antenna panels 211, 212, 213, 214, 215, and 216. Each of the transmit antenna panels 210 may include one or more antenna elements (where the number of antenna elements in a panel 210 is denoted by Q) be a single antenna element (Q=1) or an array of antenna elements (Q>1). The transmitting antenna panels 210 are arranged on a plurality of transmit circles 220 (individually identified as transmit circles 221, 222, 223). The transmitting antenna array 200 includes Ct circles (Ct is the number of transmit circles), and each of the transmit circles 220 has a corresponding radius identified as $\rho_0, \rho_1, \ldots, \rho_{Ct-1}$. In some embodiments, each transmit circle has a different radius. In some embodiments, some of the transmit circles have the same radius as one another.

In the embodiment shown in FIG. 1, the transmit circles 220 are depicted as being coplanar and parallel to the xy-plane and concentric around a transmit center point 230. Each transmit circle 220 may have a corresponding rotational offset $\beta$ as measured from the outermost transmit circle (e.g., the circle having the largest radius). For example, the first transmit circle 221 is rotationally offset from the outermost transmit circle 223 by angle $\beta_0$. (According to this notation, there may be $C_t$ rotational offsets: $\beta_0$, $\beta_1, \ldots, \beta_{Ct-1}$. Assuming that the (Ct-1)-th transmit circle has the largest radius, then $\beta_{Ct-1}=0°$.) The rotational offset may be measured between the line segments (or rays) between the transmit center point 230 and one of the transmitting antenna elements 210 (e.g., a lowest numbered antenna element) of each transmit circle. In the embodiment shown in FIG. 1, first transmitting antenna element 211 and second transmitting antenna element 212 are on the first transmit circle 221 (having radius $\rho_0$), third transmitting antenna element 213 and fourth transmitting antenna element 214 are on second transmit circle 222 (having radius $\rho_1$), and fifth transmitting antenna element 215 and sixth transmitting antenna element 216 are located on third transmit circle 223 (having radius $\rho_{Ct-1}$). Accordingly, the angle $\beta_0$ is defined as the angle between a first ray 241 between the receive center point 230 and the first transmitting antenna element 211 on the first transmit circle 221 (having radius $\rho_0$) and a third ray 243 between the transmit center point 230 and the fifth transmitting antenna element 215 on the third (e.g., outermost) transmit circle 223 (having radius $p_{Ct-1}$).

Likewise, the angle $\beta_1$ is defined as the angle between a second ray 242 between the receive center point 230 and the third transmitting antenna element 213 on the second transmit circle 222 (having radius $\rho_1$) and the third ray 243 between the transmit center point 230 and the fifth transmitting antenna element 215 on the third (e.g., outermost) transmit circle 223 (having radius $\rho_{Ct-1}$).

The receiving antenna array 100 and the transmitting antenna array 200 may also have a rotational offset $\alpha$ with respect to one another. For the sake of discussion, the angle $\alpha$ will be described herein with respect to an angle between radii of the outermost circles of the receiving antenna array 100 and the transmitting antenna array 200. In the depiction of FIG. 1, the radius of the outermost receive circle 122 (having radius $r_{Cr-1}$) of the receiving antenna panel 100 is projected 150 to the plane of the outermost circle 223 (having radius $r_{Ct-1}$) of the transmitting antenna array 200. Accordingly, the angle $\alpha$ corresponds to the angle between the projected radius 150 and the third ray 243 of the third (e.g., outermost) transmit circle 223 (having radius $\rho_{Ct-1}$).

As shown in FIG. 1, in some embodiments the number of circles at the receiving antenna panel array 100 and the transmitting antenna array 200 ($C_t$ and $C_r$, respectively) is different. In some embodiments, the number of circles at the receiving antenna array 100 and the transmitting antenna array 200 ($C_t$ and $C_r$, respectively) is the same.

In embodiments of the present disclosure where an antenna panel includes more than one antenna element (Q>1), the individual antenna elements may be arranged in a variety of different shapes such as linear, circular, rectangular, or the like.

With these parameters, the model is flexible enough to become a linear or circular array. For example, when $C_t=C_r=2$, if the two radii of the circles are the same and $\beta=90$ degree, it becomes a circular array (in the case where there are two antenna elements per circle, then it can be considered to be a square array), and it becomes a linear array if $\beta=0$ and the radii of the two circles are different.

Aspects of embodiments of the present disclosure relate to computing a set of antenna array parameters specifying the configuration of a transmitting antenna array 200 and a receiving antenna array 100 that improves or optimizes a performance metric such as by minimizing a decoding error probability, maximizing a channel capacity or throughput, and/or reducing or minimizing correlation between antenna panels, in accordance with the antenna model described above with respect to FIG. 1, based on a plurality of input parameters. The input parameters may include the number of transmit antennas panels (M), the number of receive antenna panels (N), the number of transmit circles (Ct), the number of receive circles (Cr), the distance (D) between the transmitting antenna array 200 and receiving antenna array 100, the wavelength (Λ) of the carrier frequency; and the number of antenna elements in each antenna panel (Q). The output parameters from a method according to an embodiment of the present disclosure include the radius of each of the receive circles 120 (e.g., $r_i$ for the i-th receive circle for i∈[0, Cr−1] or, equivalently, for i∈[0, Cr)), the radius of each of the transmit circles 220 (e.g., $\rho_j$ for the j-th transmit circle for j∈[0, Ct−1] or, equivalently, for j∈[0, Ct)), the rotational offset ($\alpha$) between the transmitting and receiving antenna arrays, and the rotational offsets ($\beta$) for each of the receive circles 120 and each of the transmit circles 220 (e.g., $\beta_i$ for the i-th receive circle for i∈[0, Cr−1] and $\beta_j$ for the j-th transmit circle for i∈[0, Ct−1]).

FIG. 1 depicts the antenna panels as being located on receive circles 120 and transmit circles 220. Embodiments of the present disclosure include embodiments in which the physical antenna array includes one or more physical circular support structures on which the antenna panels are mounted. However, embodiments of the present disclosure are not limited thereto, and do not require that the antenna panels be mounted on physical circles. For example, embodiments of the present disclosure further include arrangements in which all of the antenna panels are spaced at one or more distances from a center point, where the one or more distances correspond to the radii of one or more fictitious or imaginary concentric circles around the center point, without the presence of corresponding circular physical support structures. See, for example, the antenna panel array 400 described in more detail below with respect to FIG. 4.

Generally, embodiments of the present disclosure relate to improving or optimizing a performance metric by minimizing a decoding error probability, or maximizing a channel capacity or throughput, and/or minimizing channel correlations between portions of an antenna array, such as by reducing or minimizing correlation between antenna panels. The correlation is a measure of the similarity of the channel conditions that are observed by each antenna panels. Best performance (e.g., highest data throughput) is typically observed when the channel conditions observed by the antenna panels are independent (or very different) each other. This corresponds to small correlation values. Therefore, some embodiments of the present disclosure relate to computing the radius and angle parameters for the transmit circles and the receive circles to improve or optimize a performance metric of the line-of-sight (LOS) channels of the various antenna panels.

In the following discussion, a channel matrix H is defined, in which i-th row and j-th column element represents the channel condition between i-th Rx antenna panel and j-th Tx antenna panel. The correlation values between corresponding antenna pairs can then be calculated from the channel matrix H by calculating $H^H H$ or $HH^H$ (where $X^H$ means the Hermitian matrix of X). The off-diagonal elements (i-th row and j-th column element with i≠j) of the resulting matrix represent the correlation value between corresponding antenna pair (i.e., i-th and j-th antenna). Therefore, aspects of embodiments of the present disclosure relate to computing antenna parameters (e.g., $r_i$, $\beta_i$, $\rho_j$, $\beta_j$, and $\alpha$, as discussed above) that make the magnitude of the off-diagonal elements of $H^H H$ or $HH^H$ small.

In some cases, embodiments of the present disclosure relate to calculating exact solutions for the case where Q=1, $C_t=C_r=2$ that correspond to 4×4 arrangements (4 transmitting antenna elements M and 4 receiving antenna elements N). In the case where $C_t=C_r=2$, the radius $r_1$ of the inner circle may be treated as a fraction of the radius $r_1$ of the outer circle $r_0=cr_1$, where $0<c\le1$.

In some cases, the receiving antenna array 100 and the transmitting antenna array 200 may have different size constraints. For example, as noted above, a mobile station may have much less space available for an antenna than a base station. In addition, a mobile station may have a particular form factor (e.g., a smartphone generally has the shape of a thin cuboid, where two opposing sides of the cuboid corresponding to the face and the back of the smartphone are significantly larger than the remaining four sides of the cuboid corresponding to the edges of the smartphone) that enables some configurations of antennas to be more suitable than others. As another example, two communicating base stations may have different space constraints (e.g., located on the side of a building versus freestanding). Accordingly, Equations 1, 2, and 3, described in more detail, below, relate to constraints on the radii ($r_i$) of receive circles of receiving antennas and the radii ($\rho_i$) of transmit circles of transmitting antennas, where different solutions to the constraints correspond to different arrangements of antenna panels that improve or optimize a performance metric such as by minimizing a decoding error probability, maximizing a channel capacity for an antenna array, and/or minimizing correlations between those antenna panels.

Equation 1, below shows a constraint in which the product of the radius ($r_i$) of the inner receive circle and the radius ($\rho_0$) of the inner transmit circle is an odd multiple of $\Delta D/4$ (the product of the carrier wavelength λ and the distance D between the transmitting antenna array 200 and the receiving antenna array 100, with a scaling constant), where the odd multiple is indicated by k=1, 3, 5, . . . :

$$r_0\rho_0 = \frac{k\lambda D}{4}, k = 1, 3, 5, ... \quad (1)$$

Equation 2, below, shows a constraint in which the product of the radius ($r_0$) of the inner receive circle and the radius ($\rho_0$) of the inner transmit circle added to the product of the radius ($r_1$) of the outer receive circle and the radius ($\rho_1$) of the outer transmit circle, divided by the product of the carrier wavelength λ and the distance D between the transmitting antenna array 200 and the receiving antenna array 100 is an odd multiple of ½, where the odd multiple is indicated by m=1, 3, 5, . . . :

$$r_0\rho_0 + r_1\rho_1 = \frac{m\lambda D}{2}, m = 1, 3, 5, ... \quad (2)$$

Similar to Equation 1, Equation 3, below shows a constraint in which the product of the radius ($r_1$) of the outer receive circle and the radius ($\rho_1$) of the outer transmit circle is an odd multiple of $\Delta D/4$ (the product of wavelength and the distance between the transmitting antenna array 200 and the receiving antenna array 100, with a scaling constant), where the odd multiple is indicated by l=1, 3, 5, . . . :

$$r_1\rho_1 = \frac{l\lambda D}{4}, l = 1, 3, 5, ... \quad (3)$$

The solutions that meet the constraints of Equations 1, 2, and 3 include circumstances where the transmitting antenna array 200 and the receiving antenna array 100 have different radiuses or radii. This is may be a particularly useful circumstance when implementing a base station device and mobile device such as a smartphone, because a mobile device may have significant size constraints (e.g., a mobile device is generally a handheld device and may be pocket-sized), therefore the antenna of a mobile device needs to fit within the physical size constraints of its form factor or enclosure. The above equations show that the sizes of the transmitting antenna array 200 and the receiving antenna array 100 may be different. Therefore, a small antenna array in a mobile device may be compensated for by using a large antenna array at the base station, which generally has fewer size constraints. In addition, having receive (or transmit) circles of different radii may be particularly helpful in the case of a smartphone, where the size of the smartphone may constrain the placement of the antenna panels of the larger diameter circle (e.g., constrained by the longer dimension of the smartphone or the diagonal of the smartphone), while the antenna panels of circles of smaller diameter may be arranged along the smaller dimension of the smartphone.

As another special case with two circles ($C_t=C_r=2$), when other design constraints require that the angle between the circles be 90 degrees ($\beta=90°$), and where the transmit and receive circles are the same size, some aspects of embodiments of the present disclosure relate to finding parameters k, l, m and angle $\alpha$ that meet the below constraints of Equations 4, 5, and 6 (or other similar constraints) to improve a performance metric such as by minimizing a decoding error probability, maximizing a channel capacity, and/or reducing or minimizing antenna channel correlations.

As shown in Equations 4, 5, and 6 below, constraints on the radii of the inner and outer receive circles 120 ($r_0=cr_1$) and the radii of the inner and outer transmit circles 220 (where c is the ratio of the radius of the inner circle to the radius of the outer circle ($c=r_0/r_1$)) and the angle $\alpha$ between the transmit antenna array and the receive antenna array are controlled by the carrier wavelength $\lambda$, the distance D, and an odd multiple of ½, where the odd multiples is indicated by ±1, 3, 5, . . . . For example, in Equation 4, below, the odd multiple is indicated by the variable k:

$$2cr_1^2(c \cdot \cos \alpha + a \sin \alpha) = \frac{k\lambda D}{2}, \text{ where } a = \pm 1, k = \pm 1, \pm 3, \pm 5, \ldots \quad (4)$$

In Equation 5, below, the odd multiple is indicated by the variable l:

$$(r_0^2 + r_1^2) \cos \alpha = \frac{l\lambda D}{2}, \text{ where } l = \pm 1, \pm 3, \pm 5, \ldots \quad (5)$$

In Equation 6, below, the odd multiple is indicated by the variable m:

$$2r_1^2(c \cdot \sin \alpha + b \cos \alpha) = \frac{m\lambda D}{2}, \text{ where } b = \pm 1, m = \pm 1, \pm 3, \pm 5, \ldots \quad (6)$$

In some embodiments, a different constraint is used instead of Equation 5. Another constrain that gives optimal solutions is shown in Equation 5'

$$(r_0^2 + r_1^2) \cos \alpha + br_0 r_1 \sin \alpha = \frac{l\lambda D}{2}, l = \pm 1, \pm 3, \pm 5, \ldots \quad (5')$$

where using this constraint generates different solutions that are also optimal.

Examples of solutions that meet the conditions or constraints of Equations 4, 5, and 6, above, and that therefore are examples of antenna parameters that have theoretically minimum correlations between antenna panels (and therefore theoretically maximize channel capacity) when $\beta=90°$ are shown in Table 1, below:

TABLE 1

Examples of parameters that maximize channel capacity when Ct = Cr = 2 and when $\beta$ = 90°

| k | l | m | c | $\alpha$ (deg) | $r_1^2$ | |
|---|---|---|---|---|---|---|
| 1 | 1 | −1 | 1.00 | 0.00 | 0.25$\lambda$D | a Uniform Circular Array (UCA) |
| −1 | 1 | 1 | 1.00 | 63.43 | 0.56$\lambda$D | a UCA with relative rotation |
| 1 | −5 | −3 | 0.58 | 0.00 | 0.74$\lambda$D | Special case with $\alpha = 0$, $c^2 = \frac{1}{3}$ |
| 1 | 3 | −3 | 0.71 | 19.47 | 1.05$\lambda$D | |

As a third special case with two circles ($C_t=C_r=2$), when other design constraints require that the angle $\alpha$ between the transmitting antenna array and the receiving antenna array be 0 degrees ($\alpha=0°$), and where the transmit circles and the receive circles are assumed to be the same size, some aspects of embodiments of the present disclosure relate to finding parameters k, l, m and angle $\alpha$ that meet the below constraints of Equations 7, 8, 9, and 10 (or other similar constraints) to improve or optimize a performance metric such as by minimizing a decoding error probability, maximize a channel capacity, and/or reducing or minimizing antenna correlations.

Equation 7:

$$r_1^2 = \frac{k\lambda D}{4c(c + a \cos \beta)}, a = \pm 1, k = \pm 1, \pm 3, \pm 5, \ldots \quad (7)$$

Equation 8:

$$r_1^2 = \frac{l\lambda D}{2(c^2 - 1)}, l = \pm 1, \pm 3, \pm 5, \ldots \quad (8)$$

Equation 9:

$$r_1^2 = \frac{m\lambda D}{4(c \cos \beta + b)}, b = \pm 1, m = \pm 1, \pm 3, \pm 5, \ldots \quad (9)$$

Equation 10:

$$\cos \beta = \frac{(k - 2l)c^2 - k}{2lca} \quad (10)$$

where $r_0$ and $r_1$ are the radii of the two first circles of the first antenna array, c is a ratio between the radii $r_0$ and $r_1$ of the two first circles of the first antenna array, and $\beta$ is the rotational offset between the two first circles of the first antenna array and between the two second circles of the second antenna array.

Examples of solutions that meet the conditions or constraints of Equations 7, 8, 9, and 10, above, and that therefore are examples of antenna parameters that have theoretically minimum correlations between antenna panels (and therefore theoretically maximize channel capacity) when $\alpha=0°$ are shown in Table 2, below:

TABLE 2

Examples of parameters that maximize channel capacity when Ct = Cr = 2 and when $\alpha$ = 0°

| k | l | m | c | $\beta$(deg) | $r_1^2$ | Note |
|---|---|---|---|---|---|---|
| 1 | −1 | 3 | 0.33 | 0.00 | 0.57$\lambda$D | Uniform Linear Array (ULA) |
| 1 | 1 | 1 | 1.00 | 90.00 | 0.25$\lambda$D | Uniform Circular Array (UCA) |

TABLE 2-continued

Examples of parameters that maximize channel capacity when Ct = Cr = 2 and when α = 0°

| k | l | m | c | β(deg) | $r_1^2$ | Note |
|---|---|---|------|-------|---------|------|
| 3 | −1 | 5 | 0.60 | 0.00 | 0.78λD | Non-uniform linear array |
| 1 | 1 | 3 | 1.00 | 60.00 | 0.5λD | Non-uniform circular array |
| 1 | −1 | −3 | 0.58 | 90.00 | 0.74λD | |

Figure 2A:
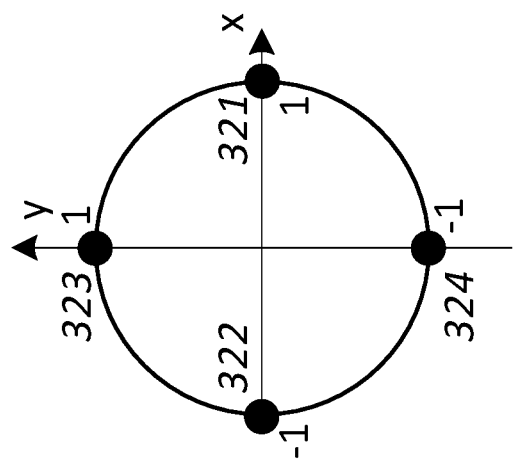
FIGS. 2A, 2B, 2C, 2D, 2E, 2F, and 2G schematically depict example arrangements of antenna arrays configured with parameters calculated in accordance with some embodiments of the present disclosure.

FIGS. 2A, 2B, 2C, and 2D schematically depict example arrangements of antenna arrays configured with parameters calculated in accordance with some embodiments of the present disclosure. In more detail, FIG. 2A depicts the first row of Table 2, where k=1, l=−1, m=3, c=0.33, β=0.00, and $r_1^2$=0.572D. In particular, as seen in FIG. 2A, antenna panels 311 and 312 are on an inner circle that has a radius that is 0.33 of the radius of the outer circle that antenna panels 313 and 314 are on, and because β is 0 degrees, the four antenna panels 311, 312, 313, and 314 are arranged in a line (e.g., form a uniform linear array, because they are evenly spaced along a line).

Figure 2B:
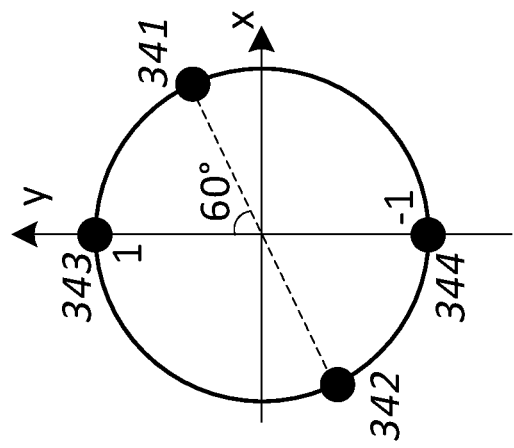

FIG. 2B depicts the second row of Table 2, where k=1, l=1, m=1, c=1.00, β=90.00, and $r_1^2$=0.25λD. In particular, as seen in FIG. 2B, because c=1.00, the inner circle and the outer circle have the same radius, and all four antenna panels 321, 322, 323, and 324 are located at the same distance from the center. The two circles are offset by 90° (β=90°) and therefore the first and second antenna panels 321 and 322 are depicted as being along the x-axis and the second and third antenna panels 323 and 324 are depicted as being rotated 90 degrees from the x-axis, that is, along the y-axis. Accordingly, the four antenna panels 321, 322, 323, and 324 form a uniform circular array because they are evenly spaced on a circle (in this case, with four antenna panels, square array).

Figure 2C:
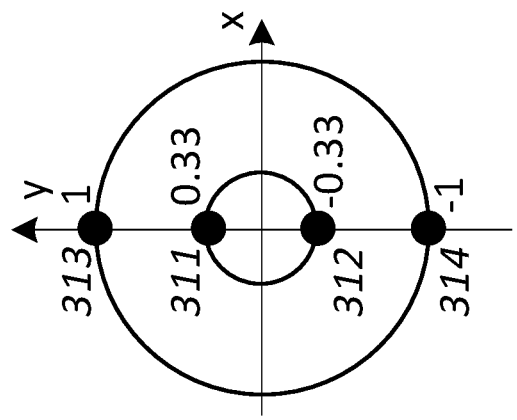

FIG. 2C depicts the third row of Table 2, where k=3, l=−1, m=5, c=0.60, β=0.00, and $r_1^2$=0.78λD. In particular, as seen in FIG. 2B, antenna panels 331 and 332 are on an inner circle that has a radius that is 0.6 of the radius of the outer circle that antenna panels 333 and 334 are on, and because β is 0 degrees, the four antenna panels 311, 312, 313, and 314 are arranged in a line (e.g., form a non-uniform linear array).

Figure 2D:
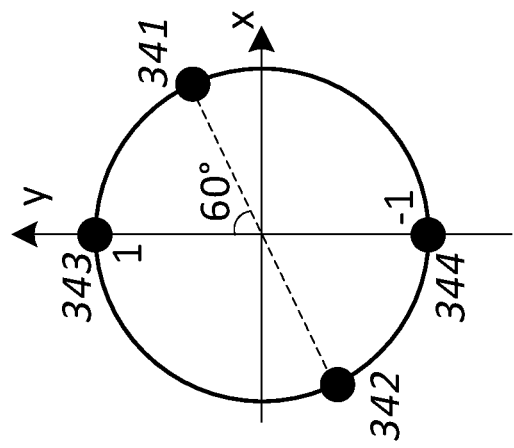

FIG. 2D depicts the fourth row of Table 2, where k=1, l=1, m=3, c=1.00, β=60.00, and $r_1^2$=0.5λD. In particular, as seen in FIG. 2B, because c=1.00, the inner circle and the outer circle have the same radius, and all four antenna panels 341, 342, 343, and 344 are located at the same distance from the center. The two circles are offset by 60° (β=60°) and therefore the first and second antenna panels 341 and 342 are depicted as being along the x-axis and the second and third antenna panels 343 and 344 are depicted as being rotated 60 degrees from the x-axis. Accordingly, the four antenna panels 321, 322, 323, and 324 form a non-uniform circular array because they are unevenly spaced on a circle (in this case, with four antenna panels, rectangular array).

While FIGS. 2A, 2B, 2C, and 2D depict some example antenna arrays in accordance with some embodiments of the present disclosure, embodiments of the present disclosure are not limited thereto, and various other suitable arrangements of antenna panels of a transmitting antenna array and a receiving antenna array may be arranged in accordance with various other embodiments of the present disclosure. For example, physical constraints such as the size of the mobile device or the size and shape of the location allocated for a base station can limit the size of the outermost transmit circle or receive circle. These constraints may be reflected in the column $r_1^2$ of Table 1 and Table 2, above and are subject to the carrier wavelength λ of the wireless communication system and the distance D between the transmitting antenna array 200 and the receiving antenna array 100.

Figure 2G:
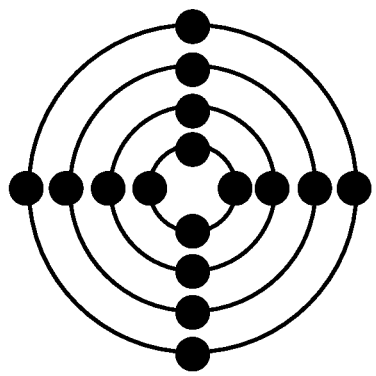
Figure 2F:
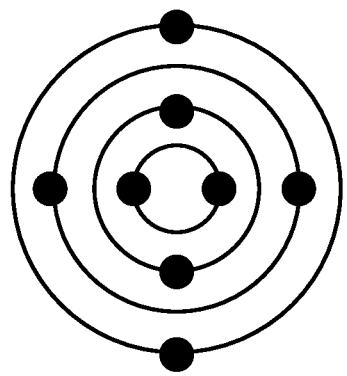
Figure 2E:
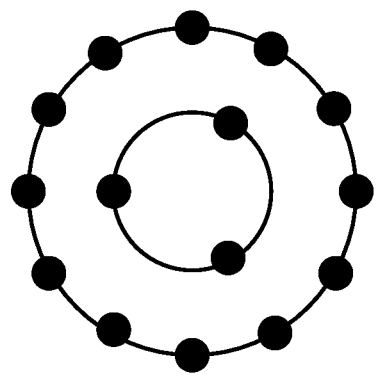

FIGS. 2E, 2F, and 2G schematically depict additional examples of antenna arrays configured with parameters calculated in accordance with various embodiments of the present disclosure. In the embodiment shown in FIG. 2E, there are two circles of different radius, where the inner circle has three antenna panels spaced apart at 120° intervals from one another, and the outer circle has twelve antenna panels spaced apart at 30° intervals from one another. FIG. 2F depicts an embodiment in which antenna panels are arranged in four circles, where each circle includes two antenna panels arranged on opposite sides of the circle from one another. Each circle is offset by 90° from the previous circle. For example, if the circles are numbered from 1 to 4 from innermost to outermost, then $\beta_3$=90°, $\beta_2$=0°, $\beta_1$=90°. FIG. 2G depicts another embodiment with four circles, where each circle includes four antenna panels evenly spaced at 90° intervals from one another, and where there are no relative rotations between the circles (e.g., $\beta_3=\beta_2=\beta_1=0$).

Figure 3:
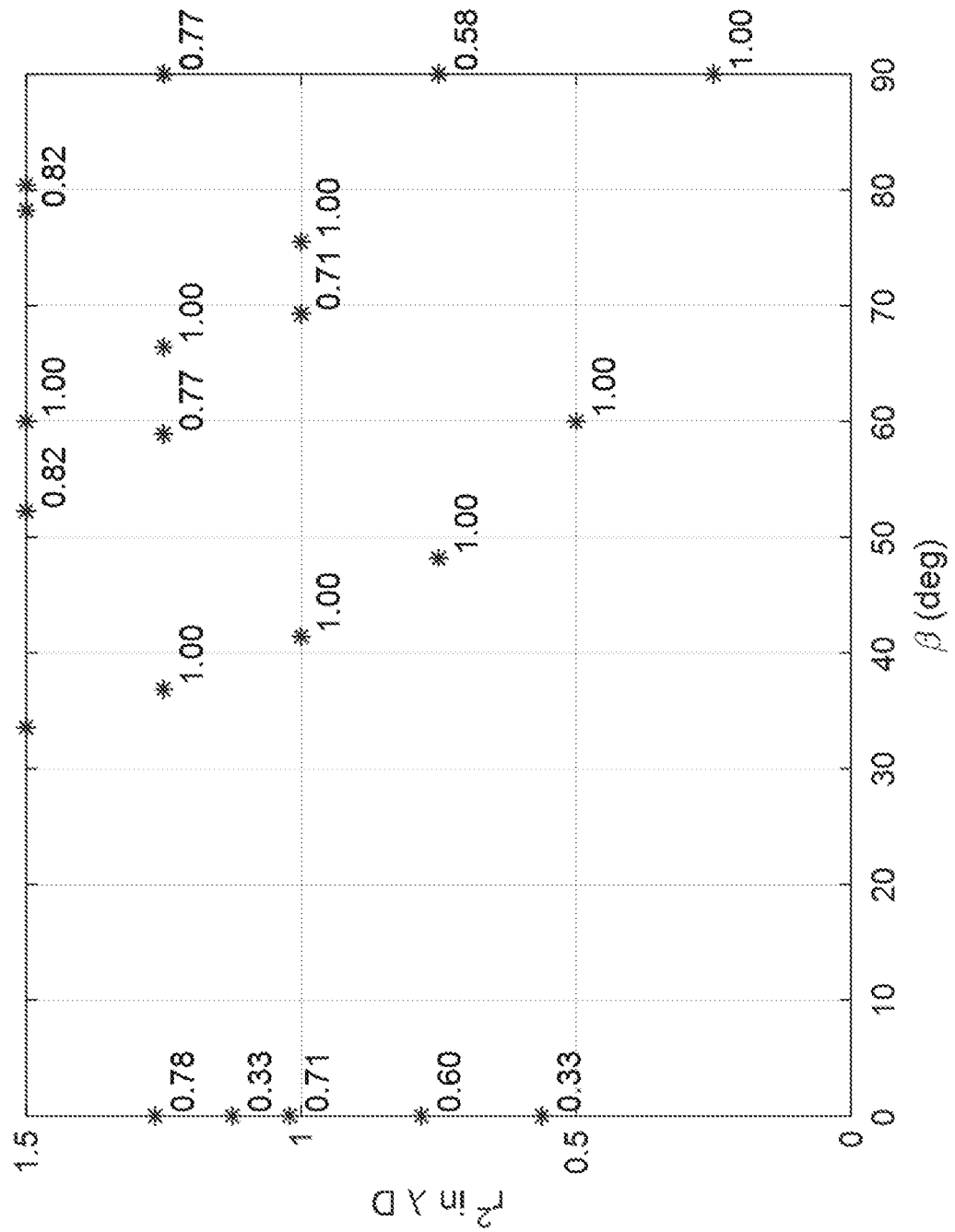
FIG. 3 is a plot depicting some possible solutions that minimize correlation terms for the Ct=Cr=2 case for a variety of values of $r_1^2$ (in units of λD) versus angle between circles β, where the parameters are calculated in accordance with a model in accordance with some embodiments of the present disclosure.

FIG. 3 is a plot depicting some possible solutions that improve or optimize a performance metric such as by minimizing a decoding error probability, maximizing a channel capacity, and/or minimizing channel correlation for the Ct=Cr=2 case for a variety of values of $r_1^2$ (in units of λD) versus angle between circles β, where the parameters are calculated in accordance with a model in accordance with some embodiments of the present disclosure.

The particular parameters calculated in accordance with the above constraints in Equations 1, 2, 3, 4, 5, 6, 7, 8, 9, and 10 relate to solutions that result in theoretically zero correlation between antenna panels. However, embodiments of the present disclosure are not limited thereto, and practical considerations of the arrangement of the transmitting antenna array, the receiving antenna array, the locations of the antenna panels within the array, the arrangements of antenna elements within the antenna panel, and the like, can result in the actual antenna correlations to be non-zero. However, embodiments of the present disclosure relate to computing parameters for arranging antenna panels that exhibit correlations that are small enough or sufficiently reduced to offer high performance in comparison to antenna arrays that are not arranged in accordance with embodiments of the present disclosure. For example, in some embodiments of the present disclosure, approximate arrangements are obtained by relaxing the constraints on Equations 1, 2, 3, 4, 5, 6, 7, 8, 9, and 10 (e.g., allowing the radii of the receive circles r and the transmit circles ρ to be within a margin of the calculated ideal values).

Some embodiments of the present disclosure relate to computing approximate solutions for M×N antennas with multiple circles at both the receiving antenna array 100 and the transmitting antenna array 200. In some embodiments, the offsets β of the transmit circles are different from the offsets β of the receive circles. According to some embodiments of the present disclosure, the general process improves or optimizes a performance metric such as by minimizing or reducing decoding error probability, by minimizing or reducing the antenna channel correlations and/or maximizes the channel capacity (or any other similar metrics) for a given set of constraints (e.g., carrier frequency λ, distance D, and the like). According to some embodiments of the present disclosure, the approximate values of the radii of the circles in the first array are calculated as a function of λ and D, such as by finding solutions to Equation 11:

$$r_i^2 = \frac{\lambda D}{k_i c_i^2} \qquad (11)$$

where i=0, ..., $C_r$–1, $k_i$ is a positive scaling parameter, and $c_i$ is the ratio of the diameter of the ith circle to the outermost outer circle $C_r$–1, where $c_{C_r-1}=1$. In some embodiments of the present disclosure, both the k and c parameters are determined through experimental tests or simulations. In the second array, similar approaches are also applied:

$$\rho_j^2 = \frac{\lambda D}{l_j \sigma_j^2} \qquad (12)$$

where j=0, ..., $C_t$–1, h is a positive scaling parameter, and $\sigma_j$ is the ratio of the diameter of the jth circle to the outermost outer circle $C_t$–1, where $\sigma_{C_t-1}=1$. In some embodiments of the present disclosure, both the l and a parameters are determined through experimental tests or simulations Some aspects of embodiments of the present disclosure relate to a dynamically configurable antenna array (e.g., a transmitting antenna array and/or a receiving antenna array) that is configured to adapt to current electromagnetic conditions. Variable antenna shapes are especially useful in line-of-sight situations where the transmitter and receiver have a direct over-the-air communication path. This would include some scenarios such as indoor office communications, outdoor wireless communications between cell towers when inter-connection between them is difficult due to geographic reasons or during disasters, etc.

For example, in some embodiments of the present disclosure, a configurable antenna array is used on an outdoor cellular base station for communicating with another outdoor cellular base station for wireless backhaul. A dynamically configurable antenna array allows the base stations to configure the antenna array to suit the particular line-of-sight (LOS) communications path available (e.g., based on the distance between the base stations and/or the size or space available for the antenna array). As another example, a configurable antenna array may also be used for communicating with one or more mobile stations. The distance D between the base station and the mobile station may change over time, as the mobile station moves through the cell that is serviced by the base station. In some embodiments of the present disclosure, the base station and/or the mobile station may dynamically reconfigure one or both antenna arrays as the distance parameter D changes over time or as LOS paths change, are obstructed, or otherwise lost (e.g., due to the failure of a base station).

Figure 4:
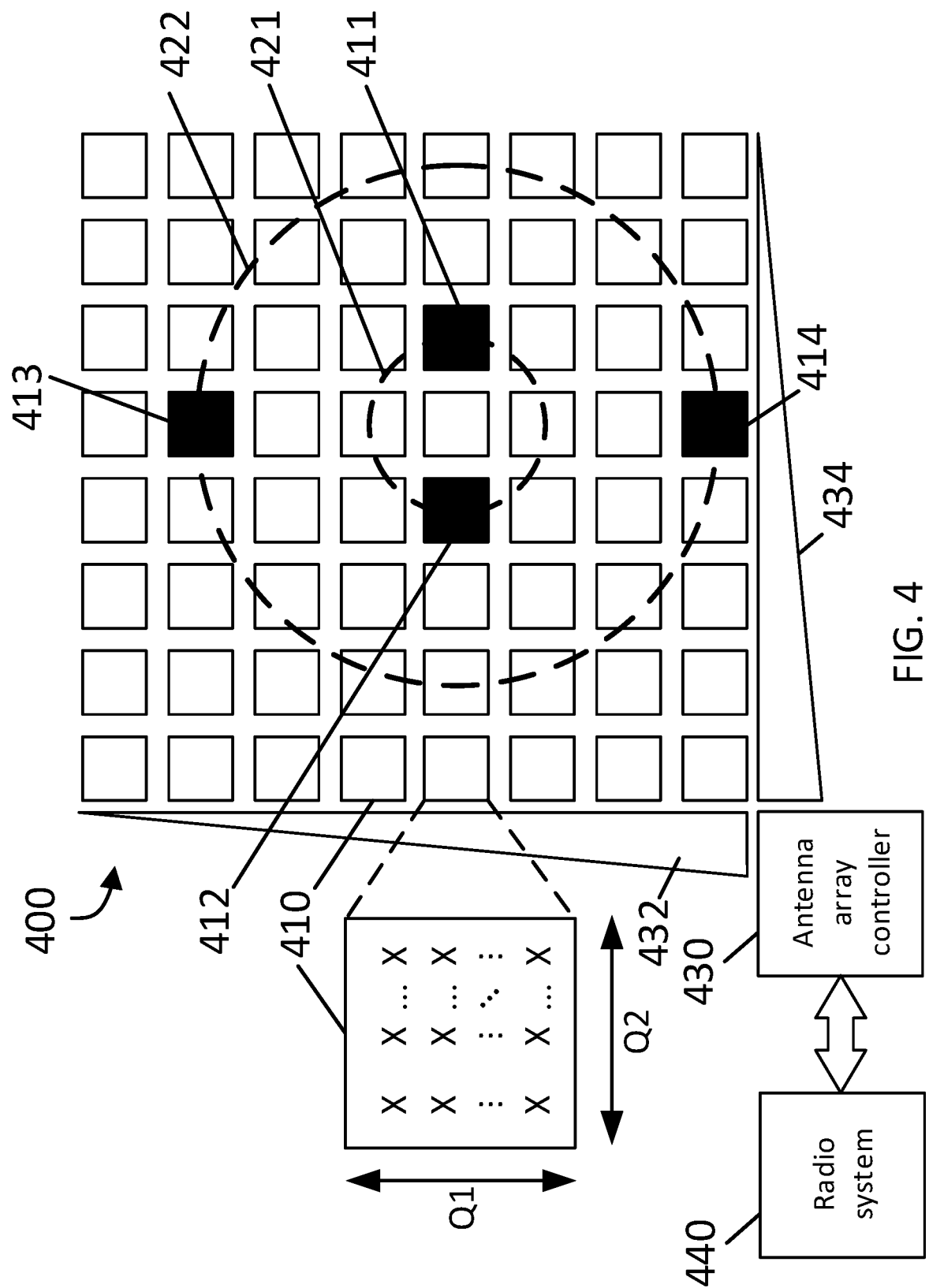
FIG. 4 is a schematic depiction of a dynamically reconfigurable antenna array according to one embodiment of the present disclosure.

FIG. 4 is a schematic depiction of a dynamically reconfigurable antenna array according to one embodiment of the present disclosure. In more detail, some embodiments of the present disclosure relate to an antenna array that is reconfigurable to operate based on given antenna array parameters, including the radius and angle parameters (e.g., r and β) calculated as discussed above. As noted above, these parameters may be computed in accordance with physical constraints of a particular antenna array (e.g., the maximum radius of the outer circle), the carrier frequency λ, and the distance between the transmitting antenna array and receiving antenna array.

According to some embodiments of the present disclosure, a large group of antenna panels is used to achieve reconfigurability. In the embodiment shown in FIG. 4, an antenna array 400 (e.g., a transmitting antenna array 200 or a receiving antenna array 100) includes a plurality of antenna panels 410 arranged in a grid. Each antenna panel 410 may be independently electronically activated and deactivated, thereby allowing arbitrary combinations of the antenna panels 410 to be activated to form an active antenna array for LOS communications with another antenna array. According to some embodiments of the present disclosure, each antenna panel 410 has a shape where a plurality of Q antenna elements (identified by X in FIG. 4) are arranged in a $Q_1$ by $Q_2$ rectangle ($Q=Q_1 \times Q_2$). However, embodiments of the present disclosure are not limited thereto and may also include Q antenna elements arranged in other shapes (e.g., rectangles, ellipses, linear arrays, and the like).

In the particular embodiment shown in FIG. 4, sixty-four (64) antenna panels 410 are arranged in an eight by eight (8×8) grid. However, embodiments of the present disclosure are not limited thereto. For example, the antenna array 400 may include more than 64 panels or fewer than 64 panels, may be formed in rectangular shapes with different height and width (e.g., a grid of panels that is taller than it is wide, to match the general shape of a smartphone), and or may have antenna panels 410 arranged in a two-dimensional grid of different shapes, such as a hexagonal grid, a triangular grid, or a circular grid. In some embodiments, the antenna panels are arranged on a flat plane. In some embodiments, the antenna panels may be arranged around a cylinder or portion of a cylinder. In some embodiments, the antenna panels may be arranged around a sphere or hemisphere in the general pattern of a truncated icosahedron.

According to various embodiments of the present disclosure, the overall size of the antenna array 400 can be very small when the communication system uses very high carrier frequency λ, such as the frequencies used or proposed in 3GPP 5G and 6G wireless communications standards. Based on the parameters calculated in accordance with embodiments of the present disclosure for the particular conditions, antenna panels that are closest to the calculated shape (e.g., closest to the ideal locations of the antenna panels in accordance with calculated radius r and rotation β parameters) are selected and turned on or activated for use. For example, FIG. 4 depicts an antenna array 400 in a state in which four panels are activated to form an antenna array that can be modeled as two circles with different radii.

In the arrangement shown in FIG. 4, antenna panels 411, 412, 413, and 414 are shaded to indicate that they are activated (or turned on), while the remaining antenna panels are unshaded to indicate that they are deactivated (or turned off). As seen in FIG. 4, first and second antenna panels 411 and 412 are on first circle 421 (indicated by the dashed line circle) and third and fourth antenna panels 413 and 414 are on second circle 422 (indicated by the dashed line circle). In a similar way, various combinations of antenna panels 410 of the antenna array 400 can be activated to reconfigure the antenna array to a set of antenna panels 410 that approximate or match the computed parameters of an antenna array with improved or optimized performance metrics such as minimized or reduced decoding error probability, maximized channel capacity or throughput, and/or minimized or reduced channel correlations in accordance with embodiments of the present disclosure. While FIG. 4 shows four antenna panels that are turned on to form one antenna array, embodiments of the present disclosure are not limited thereto, and any number of antenna panels may be turned on to form an antenna array for LOS communications with another antenna array. In addition, embodiments of the present disclosure also include embodiments where multiple antenna arrays for communicating with multiple different other antenna arrays are concurrently activated on a single grid. For example, antenna panels 411, 412, 413, and 414 form one active antenna array for communicating with a one remote antenna array, and different antenna panels 410 may be activated to form another active antenna array for concurrently communicating with another remote antenna array (e.g., at a different distance and/or at a different carrier frequency).

In the embodiment shown in FIG. 4, the antenna panels 410 are controlled and in communication with an antenna array controller or processing circuit 430. The antenna array controller 430 may be connected to the control the antenna panels 410 through interconnects 432 and 434. The interconnects 432 and 434 may be arranged to control the antenna panels 410 via separate direct connections to each individual panel or by using a crossbar switch or other multiplexing technique.

The antenna array controller 430 may be in communication components of a radio system 440, which may include analog and digital radio components such as mixers, filters, digital signal processors (e.g., baseband processors), and the like for performing radio communications in a wireless communication device via the antenna array 400 (e.g., the receiving antenna array 100 and/or the transmitting antenna array 200).

In some embodiments, the antenna array controller 430 controls the antenna panels 410 to activate (or turn on) by supplying modulated radio signals from the radio system 440 to particular ones of the panels and by coupling the signals received from the activated antennas to the radio system 440, such as by electrically connecting the activated antenna panels 410 to antenna connection ports of the radio system. In some embodiments of the present disclosure, the antenna array controller 430 is configured to compute the antenna array configuration parameters (e.g., as described in more detail with respect to FIGS. 5 and 6). However, embodiments of the present disclosure are not limited thereto. For example, in some embodiments of the present disclosure, the antenna array controller 430 controls antenna panels 410 of the antenna array 400 in accordance with antenna array parameters received from an external source (e.g., from the radio system 440). For example, in some embodiments, a mobile station may compute antenna parameters for both the mobile station and the base station and transmit the desired antenna array parameters to the base station (e.g., the mobile station may have more information about the orientation of its antenna array with respect to the base station). Likewise, in some embodiments, a base station may compute antenna parameters for the mobile station and transmit those parameters to the mobile station for configuration of its antenna array.

While FIG. 4 depicts an embodiment wherein the antenna array includes a plurality of antenna panels 410 arranged in a grid, embodiments of the present disclosure are not limited thereto. In some embodiments of the present disclosure, a reconfigurable antenna array includes a plurality of movable antenna panels 410, where one or more actuators (e.g., electromechanical actuators such as electric motors, solenoids, and piezoelectric actuators) are configured to position (e.g., physically moved) the antenna panels 410 to different locations in accordance with the antenna array configuration parameters (e.g., based on the computed radii and offset angles $\alpha$ and $\beta_i$.

Figure 5:
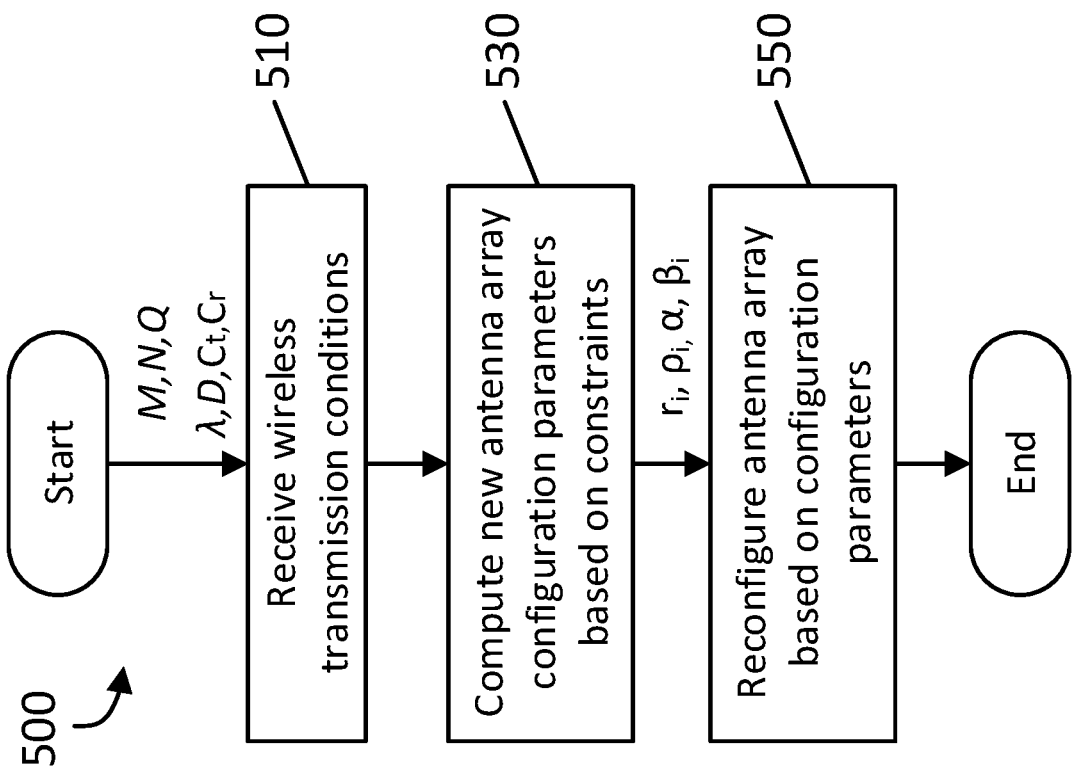
FIG. 5 is a flowchart of a method for dynamically configuring an antenna array according to one embodiment of the present disclosure.

FIG. 5 is a flowchart of a method 500 for dynamically configuring an antenna array according to one embodiment of the present disclosure. The method 500 may be implemented by a processing circuit configured to control the antenna array 400 of a wireless communications device. For example, the processing circuit may be a component of a mobile station or a component of a base station. The processing circuit may also be configured to perform other functions, such as operating as an application processor and/or as a baseband processor within the wireless communications device.

Referring to FIG. 5, in one embodiment, in operation 510, the processing circuit 430 receives wireless transmission conditions for operating the antenna array. As noted above, due to various changes in the wireless transmission conditions, one or more parameters defining those conditions may change. These parameters may include the number of transmitting antenna panels M, the number of receiving antenna panels N, the number of antenna elements Q in each antenna panel, the carrier wavelength $\lambda$, the distance D between the transmitting antenna array and the receiving antenna array, the number of transmit circles Ct, and the number of receive circles Cr. For example, the distance D may change over time when communicating with a mobile station, because the mobile station may move through a cell over time. As another example, the carrier wavelength $\lambda$ may change due to a mobile station switching to a different frequency band, or due to reconfiguration of a wireless backhaul to accommodate other sources of interference (e.g., neighboring antenna arrays operating at nearby frequencies). The number of transmitting antenna panels M or receiving antenna panels N may change due to various changes in conditions (e.g., failures of panels, different multiplexing throughput requirements, and the like), and the number of receive circles may change due to various constraints (e.g., maximum size of circles or limits to the number of circles that are possible due to the design of the antenna array).

In operation 530, the processing circuit 430 computes new antenna configuration parameters, such as the radii of the receive circles $r_i$, the radii of the transmit circles $\rho_i$, the rotational offset $\alpha$ between the transmitting antenna array and the receiving antenna array, and the rotational angles $\beta_i$ between the transmit circles and/or the receive circles within an antenna array. According to some embodiments of the present disclosure, the processing circuit applies one or more techniques, as described above with respect to Equations 1, 2, 3, 4, 5, 6, 7, 8, 9, and 10, to compute possible solutions that meet the given wireless transmission conditions (M, N, Q $\lambda$, D, Ct, Cr) and that also meet the physical constraints of the wireless communication device (e.g., constraints due to the physical size or arrangement of antenna panels 410 of the antenna array 400).

In some embodiments, more than one possible set of parameters would satisfy the input wireless transmission conditions. In such embodiments of the present disclosure, the processing circuit selects a particular one of the possible solutions to be used for configuring the antenna array. In some embodiments, the set of possible solutions is constrained by the physical characteristics (e.g., dimensions and orientation) of the physical antenna array 400. In some embodiments, the solutions are evaluated in terms of how closely the solution can be implemented on the actual antenna array 400 (e.g., how closely a selected set of antenna panels 410 of the antenna array 400 match the calculated ideal), and therefore whether the given solutions will have acceptably-low channel correlation. In some embodiments, one solution is selected randomly from among the remaining possible solutions, after removing solutions that cannot be implemented on the actual antenna array 400.

In operation 550, the processing circuit 430 reconfigures the antenna array 400 based on the computed parameters (e.g., the radii of the receive circles $r_i$, the radii of the transmit circles $\rho_i$, the rotational offset $\alpha$ between the transmitting antenna array and the receiving antenna array, and the rotational angles $\beta_i$ between the transmit circles and/or the receive circles). As noted above, in some embodiments of the present disclosure, reconfiguring the antenna array 400 includes activating particular antenna panels 410 that are closest to the computed parameters (e.g., spaced apart in accordance with the computed radii and rotated in accordance with the rotational angles $\beta$).

According to some embodiments of the present disclosure, the activation of particular antenna panels 410 of an antenna array 400 for LOS communication with another wireless communication device does not necessarily preclude the concurrent use of other antenna panels 410 of the antenna array 400. For example, one set of antenna panels 410 of an antenna array 400 of a base station may be activated for communicating with a first mobile station while a second set of antenna panels of the same antenna array may be activated for communicating with a second mobile station. The first mobile station and the second mobile station may communicate with the base station under different wireless conditions, such as at different carrier frequencies A, at different distances D from the base station, or may have different antenna size limits (e.g., a smartphone may have a smaller possible antenna array than a vehicle-mounted wireless communication device). In some embodiments, beamforming or multiplexing may further be applied to limit interference between concurrent use of antenna panels to communicate with different radio transceivers.

Figure 6:
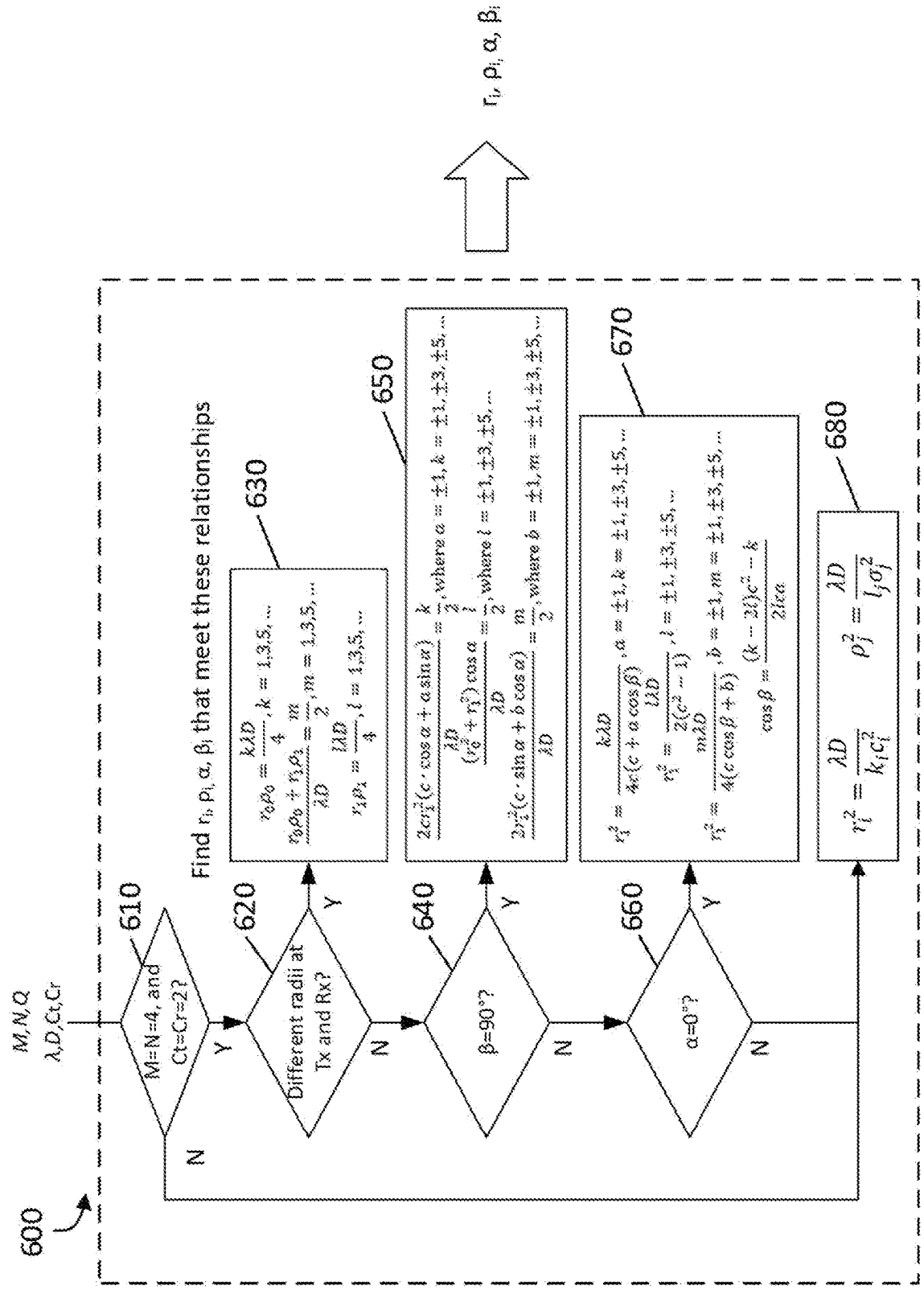
FIG. 6 is a flowchart of a method for computing antenna array parameters according to one embodiment of the present disclosure.

FIG. 6 is a flowchart of a method for computing antenna array parameters according to one embodiment of the present disclosure. According to some embodiments of the present disclosure, the method 600 shown in FIG. 6 is used when computing new antenna array configuration parameters in operation 530 of FIG. 5.

Referring to FIG. 6, in operation 610, the processing circuit determines whether the current wireless transmission conditions meets the particular case of a 4×4 transmission (4 transmitting antenna elements M and 4 receiving antenna elements N, in other words, M=N=4) and where the transmitting antenna array and the receiving antenna array both include two circles (Ct=Cr=2). If so, then the processing circuit proceeds to determine if the current wireless transmission conditions meet one of the special cases discussed above with respect to Equations 1-3, Equations 4-6, or Equations 7-10.

In more detail, in operation 620, the processing circuit determines whether the current constraints allow the radii of the transmit circles to be different from the radii of the receive circles. If so, then in operation 630 the processing circuit computes a collection of antenna parameters that includes the radii $r_i$ of the receive circles, the radii $\rho_i$ of the transmit circles, the angle $\alpha$ between the transmitting antenna array and the receiving antenna array, and the rotational offsets $\beta_i$ between the circles of the receiving antenna array and the transmitting antenna array in accordance with Equations 1-3, as discussed above.

In response to determining, in operation 620, that the current constraints do not allow the radii of the transmit circles to be different from the radii of the receive circles (e.g., require that the transmit circles and the receive circles have the same radii), then in operation 640 the processing circuit determines whether the two transmit circles must be offset by 90° from one another and whether the two receive circles must also be offset by 90° from one another. If so, then in operation 650 the processing circuit computes a collection of antenna parameters that includes the radii $r_i$ of the receive circles and the transmit circles (both the same radii), and the angle $\alpha$ between the transmitting antenna array and the receiving antenna array. The rotational offsets $\beta_i$ between the circles of the receiving antenna array and the transmitting antenna array are set at 90°. These parameters may therefore be computed in accordance with Equations 4-6, as discussed above.

In response to determining, in operation 640, that the current constraints do not require that the transmit circles and the receive circles have offsets of 90°, the processing circuit determines, in operation 660, whether the angle $\alpha$ between the transmitting antenna array and the receiving antenna array is 0°. If so, then in operation 670 the processing circuit computes the antenna parameters in accordance with Equations 7-10, as discussed above. The collection antenna parameters computed include the radii $r_i$ of the receive circles and the transmit circles (both the same radii) and rotational offsets $\beta_i$ between the circles of the receiving antenna array and the transmitting antenna array. The angle $\alpha$ between the transmitting antenna array and the receiving antenna array is set at 0°.

If, in operation 610, the processing circuit determined that the current wireless transmission conditions do not meet the particular case of M=N=4 and Ct=Cr=2, or, in operation 660, the processing circuit determined that the angle $\alpha$ between the transmitting antenna array and the receiving antenna array is not zero degrees (0°), then the processing circuit computes the antenna array parameters in accordance with Equation 11, above.

The result of computing antenna array parameters in operations 630, 650, 670, or 680 is a collection of antenna parameters that includes the radii $r_i$ of the receive circles, the radii $\rho_i$ of the transmit circles, the angle $\alpha$ between the transmitting antenna array and the receiving antenna array, and the rotational offsets $\beta_i$ between the circles of the receiving antenna array and the transmitting antenna array. These computed antenna array parameters may then be used to reconfigure either or both of the receiving antenna array and the transmitting antenna array as discussed above with respect to operation 550 of FIG. 5.

Accordingly, aspects of embodiments of the present disclosure relate to systems and methods for computing a plurality of antenna configuration parameters for improving or optimizing a performance metric such as by reducing or minimizing decoding error probabilities (or decoding error rates), maximizing throughput or channel capacity, and/or reducing or minimizing channel correlations in line-of-sight communication between radio transceivers based on input wireless transmission conditions such as number of antenna panels, distance between the communicating wireless transceivers, and carrier wavelength. Antenna parameters computed in accordance with embodiments of the present disclosure result in both regular (e.g., evenly spaced) and irregular (e.g., unevenly spaced) antenna arrays. In some embodiments of the present disclosure, antenna array controllers reconfigure antenna panels of antenna arrays based on the computed antenna configuration parameters.

FIG. 5 is a flowchart of a method for reconfiguring an antenna array based on wireless configuration parameters, and FIG. 6 is a flowchart of a method for computing antenna configuration parameters. It should be understood that the sequence of steps of the process is not fixed, but can be altered into any desired sequence as recognized by a person of skill in the art.

In some embodiments, the systems and methods for computing antenna configuration parameters discussed above are implemented in one or more processing circuits. The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), baseband processors (BPs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

It will be understood that, although the terms "first", "second", "third", etc., may be used herein to describe various elements, components, regions, and/or sections, these elements, components, regions, and/or sections should not be limited by these terms. These terms are only used to distinguish one element, component, region, or section from another element, component, region, or section. Thus, a first element, component, region, or section discussed herein could be termed a second element, component, region, or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

Although exemplary embodiments of a system and method for systems and methods for computing antenna configuration parameters and reconfiguring antenna arrays based on the computed parameters have been specifically described and illustrated herein, many modifications and variations will be apparent to those skilled in the art. Accordingly, it is to be understood that a system and method for computing antenna configuration parameters and reconfiguring antenna arrays based on the computed parameters constructed according to principles of this disclosure may be embodied other than as specifically described herein. The disclosure is also defined in the following claims, and equivalents thereof.

What is claimed is:

1. A first antenna array comprising antenna panels, the antenna panels comprising:
    one or more first antenna panels arranged on a first circle having a first radius, each of the first antenna panels comprising one or more antenna elements; and
    one or more second antenna panels arranged on a second circle having a second radius, each of the second antenna panels comprising one or more antenna elements, the second circle being concentric with the first circle at a center point, the one or more second antenna panels being arranged at a first angle around the center point with respect to the one or more first antenna panels,
    the first radius, the second radius, and the first angle being computed in accordance with wireless transmission conditions comprising:
        a line-of-sight distance to a second antenna array comprising one or more third antenna panels arranged on two or more circles; and
        a carrier frequency of a line-of-sight wireless transmission between the first antenna array and the second antenna array.

2. The first antenna array of claim 1, wherein the wireless transmission conditions further comprise:
    a plurality of the antenna panels in the first antenna array;
    a plurality of circles on which the antenna panels of the first antenna array are arranged; and
    a plurality of antenna elements in each of the antenna panels.

3. The first antenna array of claim 2, wherein the wireless transmission conditions further comprise:
    a plurality of the third antenna panels in the second antenna array; and
    the two or more circles on which the third antenna panels of the second antenna array are arranged.

4. The first antenna array of claim 1, wherein the first antenna array further comprises an antenna array controller configured to:
    compute a second angle between the first antenna array and the second antenna array, the first radius, the second radius, and the first angle in accordance with changes in the wireless transmission conditions; and
    reconfigure the first antenna array based on the first radius, the second radius, the first angle, and the second angle.

5. The first antenna array of claim 4, wherein the antenna array controller is configured to activate the first antenna panels and the second antenna panels selected from a grid of antenna panels in accordance with the first radius, the second radius, the first angle, and the second angle.

6. The first antenna array of claim 4, wherein the antenna array controller is configured to control one or more actuators to position the first antenna panels and the second antenna panels in accordance with the first radius, the second radius, the first angle, and the second angle.

7. The first antenna array of claim 1, wherein the first antenna panels and the second antenna panels are spaced non-uniformly around the first circle and the second circle.

8. The first antenna array of claim 1, wherein the first radius is the same as the second radius.

9. The first antenna array of claim 1, wherein the first radius is different from the second radius.

10. The first antenna array of claim 1, wherein the first radius, the second radius, and the first angle are computed in accordance with optimizing a performance metric.

11. The first antenna array of claim 10, wherein the metric is computed based on one or more of:
   minimizing a decoding error probability;
   maximizing a channel capacity; and
   minimizing channel correlations.

12. A method for configuring a first antenna array and a second antenna array, the method comprising:
   receiving wireless transmission conditions comprising:
      a line-of-sight distance D between:
         the first antenna array comprising first antenna panels arranged on two or more first circles; and
         the second antenna array comprising second antenna panels arranged on two or more second circles; and
      a carrier frequency $\lambda$ of a line-of-sight wireless transmission between the first antenna array and the second antenna array;
   computing antenna array parameters for the first antenna array and the second antenna array based on the wireless transmission conditions, the antenna array parameters comprising:
      one or more first radii r of the first circles of the first antenna array;
      one or more first rotational offsets $\beta_i$ between the first circles of the first antenna array;
      one or more second radii $\rho$ of the second circles of the second antenna array;
      one or more second rotational offsets $\beta_i$ between the second circles of the second antenna array; and
      a third rotational offset a between the first antenna array and the second antenna array.

13. The method of claim 12, wherein the wireless transmission conditions further comprise:
   a number of first antenna panels M in the first antenna array;
   a number of circles Cr in the first antenna array;
   a number of second antenna panels N in the second antenna array;
   a number of circles Ct in the second antenna array; and
   a number of antenna elements Q in each of the first antenna panels and each of the second antenna panels.

14. The method of claim 13, wherein the computing the antenna array parameters comprises determining that:
   the number of first antenna panels 1 in the first antenna array and the number of second antenna panels N in the second antenna array are both equal to four; and
   the first antenna panels are arranged in two first circles in the first antenna array and the second antenna panels are arranged in two second circles in the second antenna array.

15. The method of claim 14, wherein the computing the antenna array parameters comprises:
   determining that the wireless transmission conditions indicate that the first radii r of the first circles of the first antenna array are different from the second radii $\rho$ of the second circles of the second antenna array; and
   computing the antenna array parameters in accordance with constraints:

$$r_0 \rho_0 = \frac{k\lambda D}{4}, k = 1, 3, 5, \ldots$$

$$r_0 \rho_0 + r_1 \rho_1 = \frac{m\lambda D}{2}, m = 1, 3, 5, \ldots$$

$$r_1 \rho_1 = \frac{l\lambda D}{4}, l = 1, 3, 5, \ldots$$

where $r_0$ and $r_1$ are the radii of the two first circles of the first antenna array and $\rho_0$ and $\rho_1$ are the radii of the two second circles of the second antenna array.

16. The method of claim 14, wherein the computing the antenna array parameters comprises:
   determining that the wireless transmission conditions indicate that:
      the first radii r of the first circles of the first antenna array are the same as the second radii $\rho$ of the second circles of the second antenna array; and
      that the rotational offsets $\beta_i$ between the two first circles of the first antenna array and between the two second circles of the second antenna array are both 90° °; and
   computing the antenna array parameters in accordance with constraints:

$$2cr_1^2(c \cdot \cos\alpha + a \sin\alpha) = \frac{k\lambda D}{2}, \text{ where } a = \pm 1, k = \pm 1, \pm 3, \pm 5, \ldots$$

$$(r_0^2 + r_1^2) \cos\alpha = \frac{l\lambda D}{2}, \text{ where } l = \pm 1, \pm 3, \pm 5, \ldots$$

$$2r_1^2(c \cdot \sin\alpha + b \cos\alpha) = \frac{m\lambda D}{2}, \text{ where } b = \pm 1, m = \pm 1, \pm 3, \pm 5, \ldots$$

where $r_0$ and $r_1$ are the radii of the two first circles of the first antenna array and c is a ratio between the radii $r_0$ and $r_1$ of the two first circles of the first antenna array.

17. The method of claim 14, wherein the computing the antenna array parameters comprises:
   determining that the wireless transmission conditions indicate that:
   the first radii r of the first circles of the first antenna array are the same as the second radii p of the second circles of the second antenna array;
   the rotational offsets $\beta_i$ between the two first circles of the first antenna array and between the two second circles of the second antenna array are not both 90°; and
   the third rotational offset a between the first antenna array and the second antenna array is 0°; and
   computing the antenna array parameters in accordance with constraints:

$$r_1^2 = \frac{k\lambda D}{4c(c + a \cos\beta)}, a = \pm 1, k = \pm 1, \pm 3, \pm 5, \ldots$$

$$r_1^2 = \frac{l\lambda D}{2(c^2 - 1)}, l = \pm 1, \pm 3, \pm 5, \ldots$$

$$r_1^2 = \frac{m\lambda D}{4(c \cos\beta + b)}, b = \pm 1, m = \pm 1, \pm 3, \pm 5, \ldots$$

$$\cos\beta = \frac{(k - 2l)c^2 - k}{2lca}$$

where $r_0$ and $r_1$ are the radii of the two first circles of the first antenna array and c is a ratio between the radii $r_0$ and $r_1$ of the two first circles of the first antenna array.

18. The method of claim 13, wherein the computing the antenna array parameters comprises determining that:
the number of first antenna panels M in the first antenna array and the number of second antenna panels N in the second antenna array are not both equal to four; or
the first antenna panels are not arranged in two first circles in the first antenna array or the second antenna panels are not arranged in two second circles in the second antenna array; and
computing the antenna array parameters in accordance with constraints:

$$r_i^2 = \frac{\lambda D}{k_i c_i^2} \text{ and } \rho_j^2 = \frac{\lambda D}{l_j \sigma_j^2}$$

where $r_i$ is the radius of the ith circle of the first antenna array, i=0, . . . , $C_r$–1, $c_i$ is a ratio between the radius $r_i$ of the ith circle of the first antenna array and the radius $r_{C_r-1}$ of the outermost circle $C_r$–1 of the first antenna array, where $c_{C_r-1}=1$, and $k_i$ is a positive scaling parameter, and where $\rho_j$ is the radius of the jth circle of the second antenna array, j=0, . . . , $C_t$–1, $\sigma_j$ is the ratio of the diameter of the jth circle to the outermost outer circle $C_t$–1, where $\sigma_{C_t-1}=1$, and $l_j$ is a positive scaling parameter.

19. The method of claim 12, further comprising:
computing the antenna array parameters in accordance with changes in the wireless transmission conditions; and
reconfiguring the first antenna array and the second antenna array in accordance with the antenna array parameters.

20. The method of claim 19, wherein the reconfiguring the first antenna array and the second antenna array comprises:
activating the first antenna panels from a first grid of antenna panels of the first antenna array and the second antenna panels from a second grid of antenna panels of the second antenna array in accordance with the antenna array parameters.

21. The method of claim 20, wherein the first grid of antenna panels are arranged on:
a flat plane;
a portion of a cylinder; or
a portion of a sphere.

22. The method of claim 19, wherein the reconfiguring the first antenna array and the second antenna array comprises:
moving the first antenna panels and the second antenna panels using one or more actuators to arrange the first antenna panels and the second antenna panels in accordance with the antenna array parameters.

* * * * *